(12) United States Patent
Hwang et al.

(10) Patent No.: US 10,582,531 B2
(45) Date of Patent: Mar. 3, 2020

(54) METHOD FOR TRANSMITTING DOWNLINK CONTROL INFORMATION OF DYNAMICALLY VARIABLE SIZE IN WIRELESS COMMUNICATION SYSTEM AND DEVICE FOR SAME

(71) Applicant: LG ELECTRONICS INC., Seoul (KR)

(72) Inventors: Daesung Hwang, Seoul (KR); Yunjung Yi, Seoul (KR); Jaehyung Kim, Seoul (KR); Hanjun Park, Seoul (KR); Inkwon Seo, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,061

(22) PCT Filed: Oct. 26, 2017

(86) PCT No.: PCT/KR2017/011877
§ 371 (c)(1),
(2) Date: Jul. 26, 2018

(87) PCT Pub. No.: WO2018/084488
PCT Pub. Date: May 11, 2018

(65) Prior Publication Data
US 2019/0007959 A1      Jan. 3, 2019

Related U.S. Application Data

(60) Provisional application No. 62/492,901, filed on May 1, 2017, provisional application No. 62/486,984, filed (Continued)

(51) Int. Cl.
*H04W 72/12* (2009.01)
*H04W 72/04* (2009.01)

(52) U.S. Cl.
CPC ... *H04W 72/1289* (2013.01); *H04W 72/0446* (2013.01)

(58) Field of Classification Search
None
See application file for complete search history.

(56) References Cited

U.S. PATENT DOCUMENTS

RE46,810 E * 4/2018 Jin
2012/0300733 A1* 11/2012 Pelletier ............... H04L 1/1812
370/329
(Continued)

FOREIGN PATENT DOCUMENTS

KR    1020080072687    8/2008
KR    1020120129245    11/2012
(Continued)

OTHER PUBLICATIONS

PCT International Application No. PCT/KR2017/011877, Written Opinion of the International Searching Authority dated Feb. 1, 2018, 9 pages.
(Continued)

*Primary Examiner* — Kodzovi Acolatse
(74) *Attorney, Agent, or Firm* — Fish & Richardson P.C.

(57) ABSTRACT

A method in a wireless communication system is disclosed. More particularly, the method comprises the steps of: detecting first downlink control information from a base station; and, on the basis of the first downlink control information, receiving from the base station second downlink control information comprising scheduling information for uplink data transmission or downlink data reception, wherein the first downlink control information comprises an indicator for indicating whether the scheduling information is scheduling
(Continued)

information of a transmission block level or scheduling information of one or more code block levels comprising the transmission block.

8 Claims, 8 Drawing Sheets

Related U.S. Application Data on Apr. 19, 2017, provisional application No. 62/457,831, filed on Feb. 11, 2017, provisional application No. 62/416,123, filed on Nov. 1, 2016.

(56) References Cited

U.S. PATENT DOCUMENTS

| | | | |
|---|---|---|---|
| 2014/0053049 | A1 | 2/2014 | Chen et al. |
| 2014/0153484 | A1 | 6/2014 | Kim et al. |
| 2014/0307700 | A1* | 10/2014 | Seo ................. H04L 5/0053 370/329 |
| 2016/0226643 | A1 | 8/2016 | Mallik et al. |
| 2016/0233999 | A1* | 8/2016 | Chendamarai Kannan ................. H04L 5/0055 |
| 2017/0207895 | A1 | 7/2017 | Yang et al. |
| 2017/0223670 | A1* | 8/2017 | Chen ................. H04L 5/0053 |
| 2017/0223675 | A1* | 8/2017 | Dinan ............. H04W 72/042 |
| 2017/0230994 | A1* | 8/2017 | You ................ H04W 72/042 |
| 2017/0332386 | A1* | 11/2017 | Li ..................... H04L 1/1812 |
| 2018/0092051 | A1* | 3/2018 | Dinan ................ H04L 5/001 |
| 2018/0097584 | A1* | 4/2018 | Park ................. H04L 1/1812 |
| 2018/0242317 | A1* | 8/2018 | Marinier ......... H04W 72/042 |
| 2019/0104520 | A1* | 4/2019 | Kim ............. H04W 72/0446 |
| 2019/0116594 | A1* | 4/2019 | Kwak ........... H04W 72/0453 |
| 2019/0181986 | A1* | 6/2019 | Kitamura ............. H04L 1/16 |

FOREIGN PATENT DOCUMENTS

| | | |
|---|---|---|
| KR | 1020160124223 | 10/2016 |
| WO | 20160126653 | 8/2016 |
| WO | 2016165575 | 10/2016 |
| WO | WO2017221871 | 12/2017 |
| WO | WO2018145078 | 8/2018 |

OTHER PUBLICATIONS

Samsung, "DCI Formats and Contents for NR", 3GPP TSG RAN WG1 Meeting #86bis, R1-1609131, Oct. 2016, 5 pages.
Huawei, et al., "Details of two-level DCI schemes for short TTI", 3GPP TSG RAN WG1 Meeting #86, R1-166149, Aug. 2016, 6 pages.
Samsung, "Multiplexing URLLC and eMBB in DL", 3GPP TSG RAN WG1 Meeting #86bis, R1-1609059, Oct. 2016, 5 pages.
Samsung, "CB-group based retransmission for eMBB," R1-1702990, 3GPP TSG RAN WG1 Meeting #88, Athens, Greece, Feb. 13-17, 2017, 9 pages.
Ericsson, "On Code Block Group Based HARQ-ACK Feedback," R1-1706048, 3GPP TSG-RAN WG1 Meeting #88bis, Spokane, U.S., Apr. 3-7, 2017, 4 pages.

* cited by examiner

FIG. 2
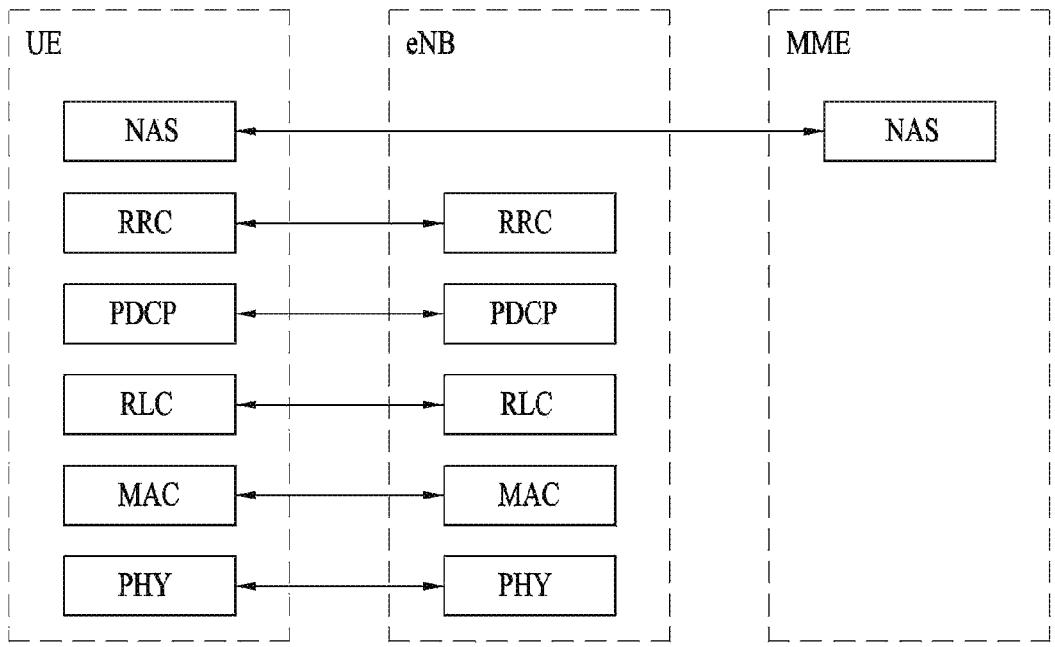
(A) CONTROL-PLANE PROTOCOL STACK
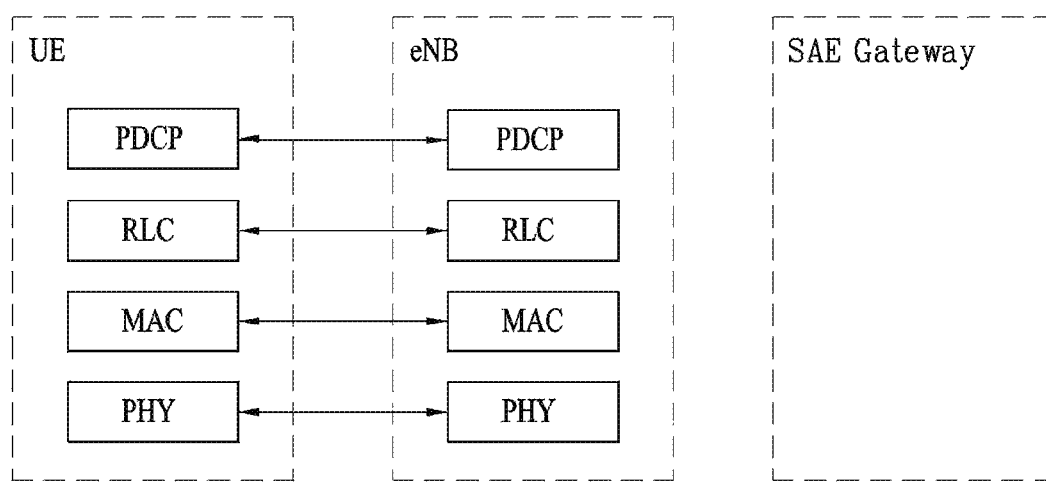
(B) USER-PLANE PROTOCOL STACK

METHOD FOR TRANSMITTING DOWNLINK CONTROL INFORMATION OF DYNAMICALLY VARIABLE SIZE IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2017/011877, filed on Oct. 26, 2017, which claims the benefit of U.S. Provisional Application No. 62/416,123, filed on Nov. 1, 2016, 62/457,831, filed on Feb. 11, 2017, 62/486,984, filed on Apr. 19, 2017, and 62/492,901, filed on May 1, 2017, the contents of which are all hereby incorporated by reference herein in their entirety.

TECHNICAL FIELD

The present invention relates to a wireless communication system and, more particularly, to a method and apparatus for transmitting downlink control information having a dynamic variable size in a wireless communication system.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and apparatus for transmitting downlink control information having a dynamic variable size in a wireless communication system.

Technical Solution

The object of the present invention can be achieved by providing a method of, at a user equipment (UE), receiving downlink control information from a base station in a wireless communication system including detecting first downlink control information from the base station and receiving second downlink control information including scheduling information for uplink data transmission or downlink data reception from the base station based on the first downlink control information, wherein the first downlink control information includes an indicator indicating whether the scheduling information is scheduling information of a transport block level or scheduling information of at least one code block level configuring the transport block.

In another aspect of the present invention, provided herein is a user equipment (UE) in a wireless communication system including a wireless communication module and a processor connected to the wireless communication module and configured to detect first downlink control information from a base station and to receive second downlink control information including scheduling information for uplink data transmission or downlink data reception from the base station based on the first downlink control information, wherein the first downlink control information includes an indicator indicating whether the scheduling information is scheduling information of a transport block level or scheduling information of at least one code block level configuring the transport block.

The method may further include configuring at least one of whether uplink data of the at least one code block level is transmitted or whether downlink data of at least one code block level is received, through a higher layer.

When a new data indicator (NDI) included in the first downlink control information is not toggled, the second downlink control information may include scheduling information for retransmission of the at least one code block level. The second downlink control information may include an indicator indicating buffer flushing of the at least one code block level.

The first downlink control information may include resource allocation information for receiving the second downlink control information. A size of the second downlink control information may vary according to a value indicated by the indicator.

Advantageous Effects

According to the embodiments of the present invention, it is possible to more efficiently transmit downlink control information even when the size of a payload dynamically varies in a wireless communication system.

The effects of the present invention are not limited to the above-described effects and other effects which are not described herein will become apparent to those skilled in the art from the following description.

DESCRIPTION OF DRAWINGS

FIG. 2 is a diagram illustrating structures of a control plane and a user plane of a radio interface protocol between a UE and an E-UTRAN based on the 3GPP radio access network specification;

BEST MODE

Figure 1:
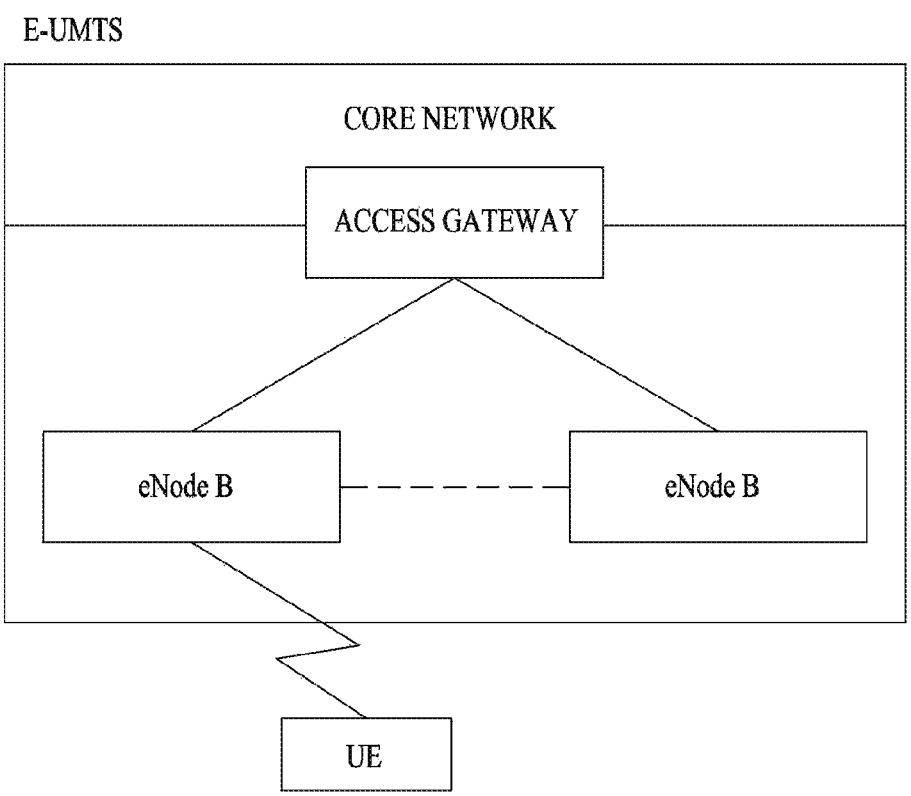
FIG. 1 is a diagram schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
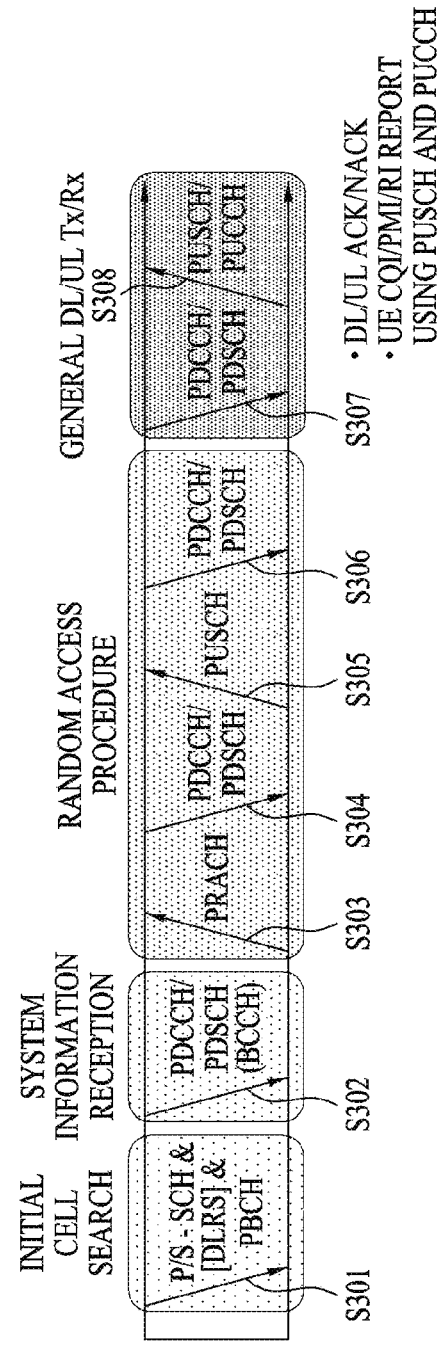
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
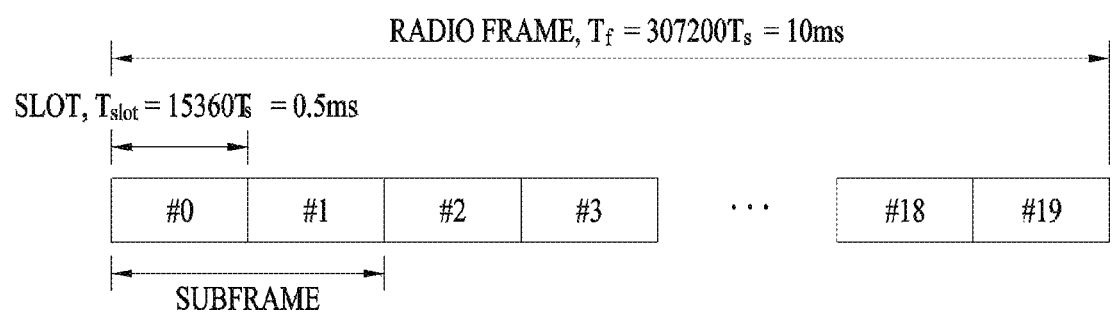
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz×2048) =3.2552×$10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
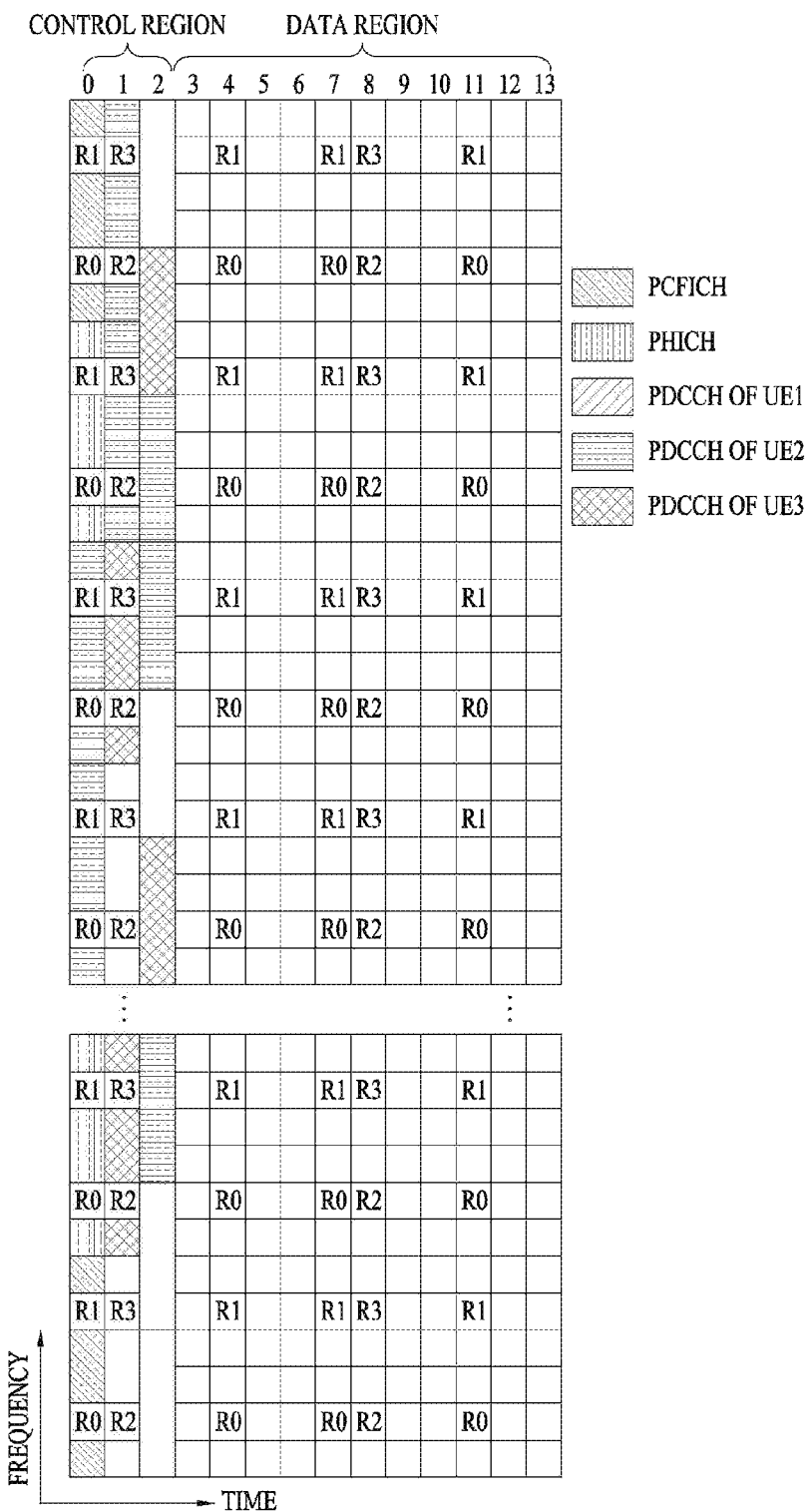
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Meanwhile, a basic resource unit of a DL control channel is an REG. The REG includes four contiguous REs except for REs carrying RSs. A PCFICH and a PHICH include 4

REGs and 3 REGs, respectively. A PDCCH is configured in units of a Control Channel Element (CCE), each CCE including 9 REGs.

To determine whether a PDCCH including L CCEs is transmitted to a UE, the UE is configured to monitor $M^{(L)}$ ($\geq L$) CCEs that are arranged contiguously or in a predetermined rule. L that the UE should consider for PDCCH reception may be a plural value. CCE sets that the UE should monitor to receive a PDCCH are referred to as a search space. For example, the LTE system defines search spaces as illustrated in [Table 1].

TABLE 1

| Type | Search space $S_k^{(L)}$ Aggregation level L | Size [in CCEs] | Number of PDCCH candidates $M^{(L)}$ |
|---|---|---|---|
| UE- | 1 | 6 | 6 |
| specific | 2 | 12 | 6 |
|  | 4 | 8 | 2 |
|  | 8 | 16 | 2 |
| Common | 4 | 16 | 4 |
|  | 8 | 16 | 2 |

In [Table 1], L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only to a specific UE and a common search space accessible to all UEs within a cell. A UE monitors common search spaces with CCE aggregation levels 4 and 8 and UE-specific search spaces with CCE aggregation levels 1, 2, 4, and 8. A common search space and a UE-specific search space may overlap with each other.

For each CCE aggregation level, the position of the first CCE (a CCE having the smallest index) of a PDCCH search space allocated to a UE changes in every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency area of the control region of a subframe. As a control channel is configured in units of a CCE but interleaved in units of an REG, a frequency diversity gain and an interference randomization gain may be maximized.

Figure 6:
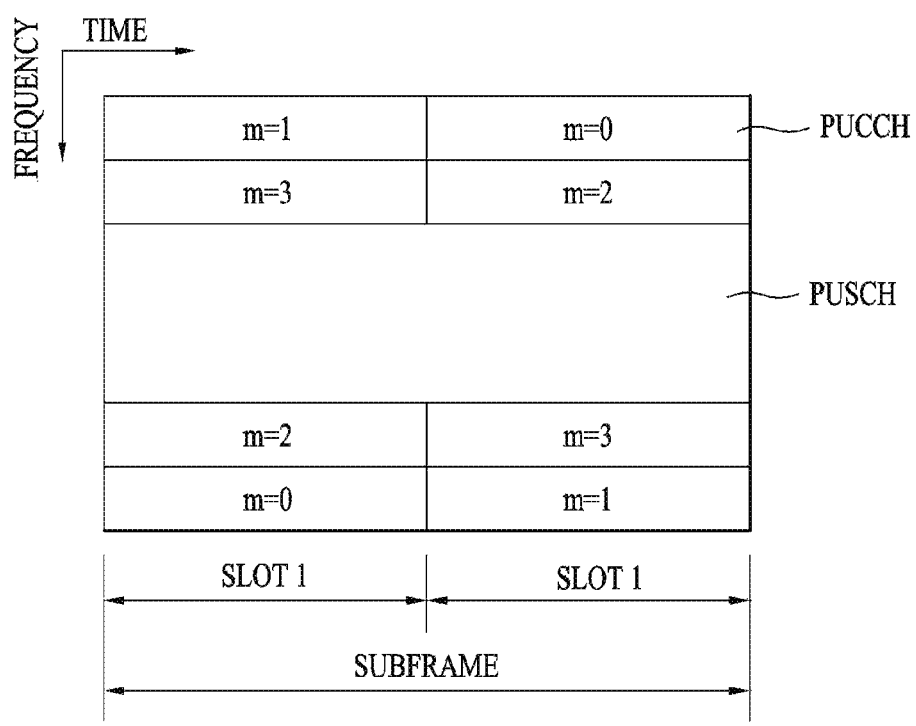
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Meanwhile, in a next-generation wireless communication system, in configuration and transmission of downlink control information (DCI) for the purpose of PDSCH scheduling, PUSCH scheduling or PRACH triggering, DCI content may dynamically vary. Specifically, as in the LTE system, the DCI content may vary depending on the purpose of using the same, a transmission method of a PDSCH, a PUSCH, a PRACH, etc. scheduled by the DCI or additional information which may be utilized during transmission and reception.

For example, the number of code blocks (CBs) or transport blocks (TBs) configuring the PDSCH may be flexibly changed and a transmission mode (TM) for transmitting the PDSCH may be flexibly changed. For reference, in the LTE system, a single TB may correspond to a single codeword in a physical layer, a cyclic redundancy check (CRC) for a TB is attached to one TB, the TB is divided into several CBs according to the size of the TB, and a CRC for a CB is attached to each of the several CBs. These resultant values are subjected to channel coding, channel-coded data is subjected to rate matching, and then the CBs are combined and transmitted to the physical layer in the form of a codeword.

It is assumed that, as resource allocation bandwidth varies, a resource block group (RBG) or PRB group size may be changed. Of course, there may be DCI having a constant content and size regardless of the configuration and configuration change of the PDSCH/PUSCH, and there may be DCI, the content and/or size of which are changed according to the configuration and configuration change of the PDSCH/PUSCH.

In particular, operation for changing the size of the DCI may be triggered through dynamic signaling, that is, MAC CE or L1 signaling. When triggering is performed through L1 signaling, which is physical layer signaling, it may be assumed that the DCI having the constant content and size is transmitted through fallback DCI. In the case of the fallback DCI, it may be assumed that a TM which may be scheduled by the corresponding DCI, a resource allocation bit size, the number of codewords, etc. may be predetermined. Such a configuration may be a value fixed in advance in association with a common search space (CSS). Alternatively, when the CSS is configured, the above-described information (that is, the TM which may be scheduled by the corresponding DCI, the resource allocation bit size, the number of codewords, etc.) may be partially configured.

For example, it may be assumed that the resource allocation field or bandwidth of the data scheduled by the DCI detected in the CSS is configured along with the CSS, which corresponds to all pieces of DCI detected in the CSS. If there is no explicit configuration, a configuration may be a value predetermined by system bandwidth, minimum system bandwidth or subband size. In addition, it may be assumed that the DCI, the size of which is changed, may be transmitted through such fallback DCI.

The fallback DCI may be detected not only in the CSS but also in a UE-specific search space (USS), and it may be assumed that there is fallback DCI, the size of which is not changed, depending on the situation. Such a fallback DCI size may be re-configured when the UE-specific bandwidth is changed. It may be assumed that the fallback DCI size is re-configured only when the UE-specific bandwidth is semi-statically changed or when the frequency region is changed and is not changed in the dynamic case.

Alternatively, when change of the fallback DCI size is not configured, the same size may be maintained and, only when change of the fallback DCI size is configured, the fallback DCI size may be changed. The change of the fallback DCI size may be performed by RRC reconfiguration or the size of the fallback DCI detected in the USS may be changed through another piece of DCI detected in the CSS. Alternatively, the fallback DCI may be configured per USS or control resource set and the change of the fallback DCI may be performed by the fallback DCI in another search space or a control resource set or the DCI detected in the USS.

Meanwhile, it is necessary to configure a method of avoiding ambiguity between a UE and a base station and/or efficiently setting a blind decoding (BD) attempt during transmission through a single downlink control channel. Alternatively, for a single PDSCH or PUSCH, DCI may be transmitted through a plurality of downlink (control) channels.

In the present invention, for convenience of description, a method of transmitting DCI, the content and/or size of which is changed according to the PDSCH/PUSCH transmission method, is assumed. However, the present invention is applicable to the method of transmitting additional flexible information.

<Search Space Separation>

In NR (New RAT), various TTI lengths or control channel monitoring periods are being considered. In this situation, the number of pieces of downlink control information (e.g., downlink data scheduling or uplink data scheduling) to be received may be changed according to control channel reception occasions. Accordingly, it may be necessary to efficiently multiplex control information and data.

In general, a method of performing TDM or FDM with respect to the control information or data or a method of separating the control information or data into spatial layers using different codes may be considered. As another method, the control information may be embedded in the data and then rate matching may be performed when the control information is detected. Alternatively, a method of dividing a region, to which the control information is mapped, or a channel, through which the control information is transmitted, and multiplexing different control information and data according to the region or the channel is applicable. For example, in a particular region, a PDSCH may be subjected to rate matching/puncturing and, in the other region, control information thereof may be subjected to rate matching/puncturing. The following options for rate matching/puncturing are possible.

It is assumed that data is not mapped within a PRG which is a PRB group including a corresponding control information region.

It is assumed that data is not mapped only in dynamic resources or static resources within the OFDM symbol, which is the corresponding control information region, within the PRB which is the PRB group including the corresponding control information region.

It is assumed that data is not mapped only in dynamic or static resources within the OFDM symbol which is the corresponding control information region from the first symbol of the control information region within the PRB which is a PRB group including the corresponding control information region.

It is assumed that data is not mapped only in dynamic or static resources within the OFDM symbols belonging to the control region within the PRB which is a PRB group including the corresponding control information region.

It is assumed that data is not mapped only within the PRB including the corresponding control information region.

It is assumed that data is not mapped only in dynamic or static resources within the OFDM symbol which is the corresponding control information region within the PRB including the corresponding control information region.

It is assumed that data is not mapped only in dynamic or static resources within the OFDM symbol which is the corresponding control information region from the first symbol of the control information region within the PRB including the corresponding control information region.

It is assumed that data is not mapped only in dynamic or static resources within the OFDM symbols belonging to the control region within the PRB including the corresponding control information region.

It is assumed that data is not mapped in the control resource set including the corresponding control information. In this case, the corresponding control resource set may be limited to a resource set including the CSS. In the case where a data start point is configured earlier than a control region in the control resource set for the CSS, it is assumed that all of the corresponding resource set is subjected to rate matching if control information is detected in the corresponding CSS. Otherwise, it is assumed that the corresponding resource set is used for data mapping.

More specifically, the method of multiplexing the control information and the data may be changed depending on the search space associated with the control information, such as a search space in which first-level DCI is detected and a search space in which second-level DCI is detected, depending on the type of control channel mapped to the search space, or depending on the CCE index. For example, in the case of a search space in which a common channel is detected, TDM/FDM/CDM is explicitly applicable to the control information and the data. In case of downlink scheduling of UE-specific control information, rate matching/puncturing is possible only when the control information thereof is detected. In the case of a control information search space for scheduling uplink grant, the same method as the common channel is applicable.

Although the method of dividing such a search space is equal to a method of transmitting several pieces of DCI, CCEs according to the maximum control region size may be pre-configured as a fixed search space and a variable search space, the fixed search space is assumed to be mapped to CCE resources corresponding to 0 to M, and a USS may be configured in (M+1)-th to last CCEs. In addition, signaling which specifies a control region size without depending on a maximum control region size may be considered and, within such signaling or in the form similar to the corresponding signal (for example, in the form of common DCI or PCFICH-like control information), a last CCE corresponding to the fixed control region or a first CCE index (or equivalent information) corresponding to the variable control region may be provided.

Such signaling may be transmitted through UE-specific DCI. That is, CCE, REG or PDCCH candidates assuming fixed rate matching may be indicated through common signaling, UE-group common signaling or UE-specific signaling. In particular, such information may indicate a last CCE, REG or PDCCH candidate or a pattern. In addition, one of a plurality of predetermined patterns may be dynamically indicated as a pattern.

As an extension thereto, a rate matching pattern may be configured for each control resource set. Whether rate matching is always performed for each resource set, whether rate matching is performed with respect to the entire set only during DCI detection or whether rate matching is performed with respect to only a region, to which DCI is mapped, during DCI detection may be determined. A plurality of reserved resource patterns may be configured and a reserved pattern, which is actually used, among the reserved patterns, may be dynamically indicated. In this case, among the rate matching patterns, a case in which no information is mapped may also be included.

The above method is applicable to uplink control region (e.g., HARQ-ACK, SR, CSI, etc.) configuration during uplink transmission. As a more specific example, the uplink control region may be divided into a fixed region and a variable region. The fixed region may be configured by the base station according to the amount of traffic and may be configured through an SIB or higher layer signaling. In the case of the variable region, the number of symbols or the amount of resources for the corresponding region may be indicated in the DCI. The DCI may be transmitted in the same TTI or indicated in the DCI corresponding to the UCI which may be transmitted in the variable region. Basically, in the case of the fixed region, overlapping may not be performed in a manner of performing TDM or FDM with the uplink data or downlink data of the same TTI.

In contrast, in the case of the variable region, the uplink data or downlink data of the same TTI and resources are flexibly shared. More specifically, specific UCI (e.g., HARQ-ACK or SR) may be transmitted through the fixed region and other UCI (e.g., CSI) may be transmitted through the variable region. When resources for the downlink data and the variable region overlap, keeping resources for UCI transmission in the overlapping region empty may be indicated through the DCI for scheduling the corresponding downlink data. When resources for the uplink data and the variable region overlap, keeping resources for UCI transmission in the overlapping region empty may be indicated through the DCI for scheduling the corresponding uplink data. The method of indicating that the resources are kept empty may be a method of indicating a transmission end time when transmitting the corresponding uplink data or downlink data.

As another method, in mapping of the PDSCH or the PUSCH, the base station may indicate a region to be subjected to rate matching or puncturing (e.g., PRBs or time-frequency resources) through higher layer signaling, DCI or a combination thereof. The above-described method may be used in an environment in which transmission of a specific PDCCH may be guaranteed and, at the same time, resources used for a specific PDSCH may be used as much as possible.

<Divisional DCI Transmission Method>

In a next-generation wireless communication system, DCI may be divided into at least two portions and the portions may be transmitted through different downlink channels. For convenience of description, the portions are referred to as first DCI and second DCI. Scheduling for the PDSCH and/or the PUSCH may be composed of a combination of first DCI information and second DCI information. In addition, in consideration of basic default operation (e.g., fallback operation, uplink grant or SIB transmission or a scheduling mode of a self-contained structure capable of transmitting HARQ-ACK information within the same TTI), operation capable of transmitting and receiving the PDSCH and/or the PUSCH only using the first DCI may be considered. In addition, a region in which the first DCI is transmitted may be limited to a first symbol within the TTI.

For example, the content configuration and size of the first DCI may be constant regardless of the PDSCH or PUSCH transmission method (e.g., the number of TBs, the TM and/or the precoding information). The first DCI may be transmitted through a channel dedicated to DCI transmission, like the PDCCH. In addition, a region in which the first DCI is transmitted or a region in which the first DCI may be transmitted may be a predefined search space (or time/frequency region) or a semi-statically configured search space (or time/frequency region). The start time of the time/frequency in which the first DCI is transmitted or the time/frequency in which the first DCI may be transmitted may be fixed or semi-statically configured and the end point thereof may be dynamically indicated. In contrast, the end time of the time/frequency in which the first DCI is transmitted or the time/frequency in which the first DCI may be transmitted may be fixed or semi-statically configured and the start point thereof may be dynamically indicated. Alternatively, the region in which the first DCI is transmitted or the region in which the first DCI may be transmitted may be a search space or time/frequency region configured through system information or a broadcast channel (PBCH).

If the PDSCH for the same UE or the PDSCH for different UEs is transmitted when the first DCI is transmitted, the corresponding PSDCH may be subjected to rate matching (or puncturing) in a direction of avoiding the time/frequency resources or the search space for the first DCI, thereby performing resource mapping. Even when the region in which the second DCI is transmitted or the region in which the second DCI may be transmitted overlap the region for the first DCI, rate matching (or puncturing) may be performed in the direction of avoiding the time/frequency resources or the search space for the first DCI during resource mapping for the second DCI. If the first DCI and the second DCI may be transmitted through MU-MIMO, rate matching/puncturing may be limited to the MU-MIMO code/layer in which the first DCI and the second DCI overlap.

The content configuration and size of the second DCI may be changed according to the PDSCH or PUSCH transmission method (e.g., the number of TBs, the TM and/or the precoding information, whether initial transmission or retransmission is performed, whether multi-slot scheduling or single-slot scheduling is performed, whether single slot or slot +mini-slot scheduling is performed, whether slot or mini-slot scheduling is performed, HARQ-ACK feedback method, whether self-slot or cross-slot scheduling is performed). Basically, the content and/or size of the second DCI may time-vary and the corresponding content configuration and size information and whether transmission is performed or not may be indicated in the first DCI.

For example, a plurality of candidates for the second DCI may be configured through system information or higher layer signaling (in the form of a format, field on/off or size). In the first DCI, one of the corresponding candidates may be indicated. More specifically, a specific candidate (e.g., indicated as 00..0 in the first DCI) for the second DCI may be predefined for default operation.

Next, a detailed example of a region in which the second DCI is transmitted and a method thereof will be described.

(1) First Example

The second DCI may be transmitted in the form of a PDCCH through a predefined or higher layer signaled search space or time/frequency resources. Specifically, the region in which the second DCI may be transmitted may be overridden by the PDSCH of another UE. In other words, when a resource region for the PDSCH and the search space for the second DCI entirely or partially overlap, the PDSCH may be transmitted. Specifically, the search spaces for the first DCI and the second DCI may share a CCE index, the search space for the second DCI may be indicated by a start CCE index, and a corresponding indication value may be transmitted through higher layer signaling or may be indicated by an SIB, etc.

(2) Second Example

The second DCI may be transmitted in the form of a PDCCH through a dynamically configured search space or time/frequency resources. Specifically, the region for the second DCI may be indicated through the first DCI or other DCI. Alternatively, the region for the second DCI may be indicated through another cell-specific or group-specific channel. The region in which the second DCI may be transmitted may be overridden by the PDSCH of another UE. In other words, when a resource region for the PDSCH and the search space for the second DCI entirely or partially overlap, the PDSCH may be transmitted. More specifically, the resource used when transmitting the second DCI (that is, the mapping start location and/or the entire mapping region) may be indicated in the first DCI. In this case, the UE may omit BD when detecting the second DCI. More specifically, in the first DCI, an aggregation level for the second DCI may be indicated. When the second DCI is used to schedule the PDSCH, rate matching (or puncturing) may be performed in a state of avoiding the location where the second DCI is actually mapped during resource mapping for the PDSCH. Specifically, the search spaces for the first DCI and the second DCI may share a CCE index, the search space for the second DCI may be indicated by a start CCE index, and a corresponding indication value may be transmitted through higher layer signaling or may be indicated in the first DCI.

(3) Third Example

The second DCI may be transmitted through all or some of the time and/or frequency resources, through which the PDSCH corresponding to the corresponding DCI is transmitted. In particular, this method may be limited to the case where the purpose of the second DCI is PDSCH scheduling. At least the DL-SCH and the second DCI may be individually coded (in order to prevent BD). The method of mapping the second DCI in the PDSCH resources (e.g., the number of REs, RE locations and/or whether local mapping or distributed mapping is performed) may be indicated in the first DCI.

More specifically, in the first DCI, an aggregation level for the second DCI may be indicated. Alternatively, the method of mapping the second DCI based on the size of the second DCI may be implicitly configured. In the case of the number of REs, a higher layer signaled offset is further applicable. In the method of transmitting the second DCI, the same modulation order as the corresponding PDSCH may be used or a specific modulation order (e.g., QPSK) may be always used in order to protect the DCI.

In addition, a combination of antenna ports (APs) or the number of APs used to transmit the second DCI may be different from that of the PDSCH. In particular, the above-described method is suitable for the case where the additional information of the AP is configured in the second DCI. More specifically, the search spaces for the first DCI and the second DCI may share a CCE index, the search space for the second DCI may be indicated by a start CCE index, and a corresponding indication value may be transmitted through higher layer signaling or may be indicated through the first DCI or other DCI or may be indicated through another cell-specific or group-specific channel.

The method of configuring the transmission region for the second DCI may be independently configured according to the purpose of the DCI (e.g., PDSCH scheduling and PUSCH scheduling). For example, an indication value for downlink assignment and/or UL grant is configured and transmitted in the first DCI and a transmission region for the downlink assignment DCI and a transmission region for the uplink grant may be independently configured according to the corresponding indication value. In the DCI, the transmission region for the downlink assignment and the transmission region for the uplink grant may be indicated by a separate DCI field or may be configured in the form of a set in a higher layer and indicated by a single DCI field. In addition, the above method is applicable to the case where the size of the second DCI is fixed.

The transmission APs of the first DCI and the second DCI may be configured as the same set. Alternatively, according to the situation, the transmission AP of the first DCI and the transmission AP of the second DCI may be configured as different sets for the purpose of performing operation such as MU-MIMO. Since the above methods may differ according to the degree of correlation between the transmission APs, the methods may be independently configured. For example, the AP for the first DCI may be configured in a higher layer and the AP for the second DCI may be configured through higher layer signaling or in the first DCI. Alternatively, whether the transmission APs or transmission AP sets of the first DCI and the second DCI are equal may be configured through an additional indication value.

In encoding the DCI, the UE may be specified through CRC masking. For example, a UE without a specific RNTI may fail in CRC for the DCI and a UE with the corresponding RNTI may succeed in CRC for the DCI. When the DCI is transmitted twice, CRC overhead may be increased. In order to alleviate this problem, differently configuring the CRC lengths for the first DCI and the second DCI may be considered. More specifically, the CRC length for the second DCI may be relatively small.

In contrast, when the CRC length is decreased, a false detection probability may be increased. In addition, performance of identifying the UE through CRC masking may be lowered. In this case, the UE is identified at the LTE system level in the first DCI and, even when the UE is not identified at a corresponding point of time, the UE may be finally identified in the second DCI. Alternatively, in order to increase performance of identifying the UE in the first DCI and/or to increase false detection performance, all or some of the information (e.g., RNTI) capable of identifying the UE in the first DCI may be transmitted in preparation for reduction of CRC masking sequence types. For example, X bits of the RNTI may be used as a CRC masking sequence and the remaining Y bits may be transmitted through the first DCI.

Meanwhile, in a next-generation wireless communication system, retransmission scheduling of a single CB or CB group level may be supported. In this case, all or some of scheduling information based on a single TB or TB group level may be included and transmitted in the first DCI. The first DCI may further include an indicator indicating whether the second DCI includes information on CB group level scheduling and/or TB group level scheduling (or single TB level scheduling) or not. Alternatively, a second DCI field size may be determined according to the HARQ process of the TB level DCI and the NDI combination. For example, when the NDI is not toggled in the first DCI, CB level retransmission may be scheduled in the second DCI for the corresponding TB.

When the indicator indicating whether the second DCI includes information on CB group level scheduling and/or TB (group) level scheduling or not, which is included in the first DCI, indicates CB group level scheduling, the second DCI may include information for CB group level scheduling. The DCI for the CB group level scheduling may include the following CB group information to be scheduled and a combination of all or some of a single piece or a plurality of pieces of scheduled per-CB-group information.

(A) CB Group to be Scheduled

Basically, the number of CB groups may be fixed or changed according to the TBS and the CBG size may be fixed. In addition, the number of CB groups may be changed and indicated through higher layer signaling or DCI. If the number of CB groups is indicated in the DCI, the number of CB groups may be indicated in the second DCI having a variable size in the case of two stages (the first DCI and the second DCI are separately transmitted). Alternatively, if the number of CBGs is indicated in the first DCI, the second DCI may indicate TB level scheduling in a manner of setting the CBG to 1. Of course, the number of CBGs may be indicated to represent CBG level scheduling.

In addition, the CB group configuration method may be fixed or indicated through higher layer signaling or DCI. In the upper layer, CB group candidates may be specified. A plurality of consecutive CBs may configure a CBG in consideration of puncturing and the CBG may be configured in units of a single CB or a plurality of CBs. For example, CB grouping may be performed by modulo operation of the CB index.

In addition, a bitmap for a CB group may be configured. In this case, flexibility of the CB configuration is guaranteed, but overhead may be large. Alternatively, a start CBG index and an end CBG index to be scheduled or the number of CBGs may be indicated. As a detailed example, like the resource indicator value (RIV) of the LTE system, the CBG to be scheduled may be represented by a combination of the start CBG index and the number of consecutive CBGs. In particular, when the number of CBGs is N, the field size indicating the CBG may be set to floor($\log_2(N^*(N+1)/2)$) bits.

Additionally, the CB group to be scheduled may be proportional to the number of CB groups for transmitting A/N. The CB index may be transmitted by the number of CB groups in which NACK has been received or the number of CB groups in which NACK has been received may be specified. When the number of CB groups is equal to the number of CB groups of NACK transmitted by the UE, the UE assumes that NACK transmission succeeds and maps the CB group to NACK or CB in transmission order for retransmission. When the number of CB groups is not equal to the number of CB groups of NACK transmitted by the UE, the UE assumes that HARQ-ACK transmission fails and requests retransmission of the TB or retransmits A/N for each CB group. When the network recognizes that A/N transmission has failed through CRC, retransmission of all CBs may be performed. In this case, in the CB group to be scheduled, the number of originally transmitted CBs may be represented. When the number of CB groups is greater than the number of CBs or CB groups in which NACK has been received, it may be assumed that all TBs are retransmitted. Alternatively, such a method may be performed by falling back to TB level retransmission even during retransmission.

(B) Single Piece or Plural Pieces of Scheduled Per-CB-Group Information

The scheduled per-CB-group information (e.g., the second DCI) may include NDI, RV, layer information and/or codeword (CW) information. In particular, since the ACK/NACK states may differ between layers during MIMO operation, layer information may be necessary to concentrate CB groups in a specific layer.

Further, the NDI and/or RV may be used to identify corrupted bits during puncturing. Additionally, the NDI and/or RV may indicate whether puncturing is performed or whether the UE flushes or combines a buffer with respect to the corresponding CB group. Alternatively, when CB group level scheduling is performed before HARQ-ACK timing using the NDI which is not toggled with respect to previous transmission and/or the same RV, the UE flushes the buffer with respect to the corresponding retransmission CB group. Alternatively, separate bits indicating whether the buffer of the CB group is flushed may be defined.

Meanwhile, information on CB group level scheduling is not limited to being transmitted only in the second DCI and is applicable to where combination with the DCI for TB-group level scheduling is performed. For example, the TB (group) level scheduling DCI and the CBG level scheduling DCI may be distinguished in the following manner The search spaces may be differently configured. That is, the network may separately configure the search space for the CBG level scheduling DCI.

The resource sets may be differently configured. That is, the network may separately configure the resource set for the CBG level scheduling DCI. The resource set may be configured in the frequency domain or in the time domain (e.g., slot or mini slot) and may be represented in the above resource combination.

As a method of avoiding increase in BD, the sizes of the DCIs are equally defined and may be distinguished by altering DM-RS scrambling and/or CRC masking. In general, CBG level scheduling may have a different required field size and may borrow other fields (e.g., some bits of resource allocation) during CBG level scheduling. For example, a single or a plurality of most significant bits (MSBs) of a resource allocation (RA) field may be used and a predetermined number of MSBs of the RA may have a specific value (e.g., 0 or a value indicated through higher layer signaling).

This method may be used to distinguish between TB level retransmission and CB level retransmission/CB group level retransmission or between DCI for distinguishing between transmission for HARQ-ACK combining and transmission for flushing during CB level retransmission/CB group level retransmission. Of course, this method may be used to distinguish between TB level retransmission and CB level retransmission or CB group level retransmission.

<DCI Transmission Through Single Channel>

In a next-generation wireless communication system, even when DCI content and/or DCI size are flexible, transmission through a single channel (e.g., a PDCCH) may be considered. The DCI may be transmitted through a channel dedicated to DCI transmission, such as a PDCCH. In addition, a region in which the corresponding PDCCH is transmitted or a region in which the corresponding PDCCH may be transmitted may be a predefined search space or time/frequency region or a search space or a time/frequency region configured through signaling of at least system information (e.g., information transmitted through a broadcast channel (PBCH)). During transmission through a single channel, there is a need for a method which does not increase the number of times of BD and complexity of a UE. Next, a detailed example of a method of configuring DCI and a transmission method will be described.

(A) In the next-generation wireless communication system, simultaneous transmission of information on the DCI transmission method (DCI format and/or the size or content) when transmitting the DCI may be introduced. The corresponding information may be coded separately with the other fields of the DCI. In this case, the UE may attempt to detect the information on the remaining fields after detecting the information on the DCI. Specifically, when a single-level DCI method and a multi-level DCI method such as two-stage are flexibly used, an indication value indicating whether the single-level DCI method or the multi-level DCI method is used may be transmitted during transmission of the DCI, together with or separately from the information on the DCI size.

As a specific example, the aggregation level may differ according to the channel environment and the UE situation during DCI transmission and the above information may also need error protection increase. For example, in the information on the DCI transmission method, the number of mapping REs fixed in advance or in the form of higher layer signaling for each resource unit (e.g., REG or CCE) for DCI transmission may be determined, and, as the aggregation level for the DCI is increased, the amount of resources for transmitting the information on the DCI transmission method may also be increased. As the distribution or resource mapping method of the corresponding resources, in order to prevent collision between DCI transmission information between different cells or transmission and reception points (TRPs), the resources may be mapped to be distributed according to the cell ID, the TRP ID or the higher layer signaled ID. It will be apparent that this method may be used to indicate the transmission method of specific DCI even in the method of scheduling a plurality of pieces of DCI with respect to the same PDSCH or PUSCH.

In transmission of the information on the DCI transmission method, an RS modulation method is applicable. More specifically, a plurality of RSs may be included for each specific resource unit (that is, PRB (group) or REG (group) or CCE (group)), and multiplying some specific RSs by coded bits of the DCI information may be considered. For example, when the number of RSs in a specific REG is 4, two RSs may be selected therefrom, and information on DCI may be generated in the form of QPSK and then multiplied by the corresponding RSs. In the above situation, the UE may know the information on the DCI through a phase difference when receiving the RS supposed to experience a similar channel in the corresponding REG and attempt PDCCH detection for the DCI based on the information. In addition, as the aggregation level for the PDCCH is increased, the REG including RS may be increased and transmission of DCI information through RS modulation in each REG may be considered. In this case, as the aggregation level is increased, information on the DCI transmission method may be more robustly transmitted. It will be apparent that this method may be used to indicate the transmission method of specific DCI even in the method of scheduling a plurality of pieces of DCI with respect to the same PDSCH or PUSCH.

(B) The DCI may always be coded based on a maximum size. The maximum size may be the maximum when the DCI size is flexible. In this case, the DCI may always have field values of various situations. The DCI may not use all or some of the field values, and, in this case, the corresponding field may be set to a specific value (e.g., 0).

(C) The DCI content and/or size may be differently configured according to the search space (set), the CCE index or the control resource set. The CCE index may be a start or end CCE index during DCI transmission.

When the number of candidates of the CRC masking sequence is decreased in order to reduce CRC overhead or to increase false detection performance, as a method of improving performance of identifying the UE, all or some of information (e.g., RNTI) capable of identifying the UE may be transmitted in the DCI. For example, X bits of the RNTI may be used as a CRC masking sequence and Y bits may be transmitted in the first DCI.

When the DCI size is flexibly changed, BD attempt may be complicated from the viewpoint of the UE. In particular, if BD attempt is divided by DCI size, flexibility of DCI transmission may be reduced. As a method of avoiding the above method, the DCI size may be fixed and, at the same time, the content configuration (e.g., change in size of a specific field and/or field removal or addition) thereof may be changed. Basically, a total payload size may be specified with respect to specific DCI (e.g., DCI mapped to USS).

For example, the base station may set the total payload size for the DCI to N bits, and N may be set in a higher layer and may be set through a third PDCCH. Characteristically, the base station may set N depending on whether the DCI is used to schedule the PDCCH or PUSCH. Thereafter, the content configuration of the DCI may be flexibly changed within the payload size of N. As a detailed embodiment of the field configuring the DCI, the following methods or a combination thereof may be considered.

A field indicating information on a DCI transmission method (content configuration method) may be included. A plurality of patterns may be set in advance and the pattern may be dynamically indicated.

A field indicating the number of RBs configuring an RBG or the number of RBGs may be included. Candidate values of information on an actual RBG by an indication field may be set in a higher layer. The field size of the resource allocation field may be flexible based on the information on the RBG.

In the next-generation wireless communication system, a field indicating whether the PDSCH and/or the PUSCH scheduled by DCI includes all TBs or some CBGs for a specific TB or TB set may be included. According to the field value, automatic change of several DCI field combinations may be considered. For example, if TB based scheduling is indicated, since both initial transmission and retransmission may be regarded as being possible in the HARQ process, the DCI may include a HARQ process number, redundancy version (RV), ND and/or modulation and coding scheme (MCS). In addition, even in the case of resource allocation, all states may be used according to the field size allocated in consideration of flexibility.

In contrast, when CBG based scheduling is indicated, retransmission may be focused upon in the HARQ process. In this case, the sizes of some fields may be reduced or removed as compared to the TB based DCI. For example, if CBG based scheduling is indicated, the NDI field may be omitted and only which HARQ process retransmission is performed may be expressed by the HARQ process number. In addition, in the case of retransmission, since the TBS may be estimated from initial transmission, the MCS field size may be reduced. As a detailed example, only a MCS state, in which only the modulation order is changed, of the MCS states may be used and thus the MCS field size may be reduced. In this case, initial transmission may be recognized based on the HARQ process number. RV may still be used.

In the case of CBG based scheduling, information on a CBG to be retransmitted needs to be included and the total number of CBGs for a specific TB or TB set may be flexible. For example, if the CBG is configured/set in the form of being approximately aligned with a specific time and/or frequency resource, the number of CBGs may be changed while the reference resource thereof is flexibly changed or the number of CBGs may be flexible according to the TBS. In this case, the corresponding field size of the information on the retransmission CBG may be changed according to initial transmission for the same HARQ process. Some bits (e.g., MSB or LSB) of the resource allocation field may result in field size reduction in an unused form. Bits reserved through reduction or removal may be used to indicate retransmission CBG. For this, CBG based transmission may be assumed to be always used for only retransmission or is applicable by determining whether initial transmission or retransmission is performed using the NDI field.

Finally, a reserved field may be included. The size of the reserved field may be flexible. For example, the field size may differ when TB based operation is indicated and when CBG operation is indicated. The corresponding field may include zero padding.

Meanwhile, the base station may change the content configuration method using fields having flexible sizes, but the total payload size may be fixed to N. A process of adjusting the DCI size to N by performing zero padding with respect to the bits left after field size change may be performed.

When the field size of the information on (re)transmission CBG is changed, only removal or size reduction of a specific field may be performed according to the field size or removal or size reduction of a plurality of specific fields may be necessary. Next, detailed options for different field size change methods when changing the field size for (re) transmission CBG in which the total payload size for the DCI is maintained at a certain level will be described. The following methods may consider a form in which various methods are changed or a form of being changed to a combination according to the amount of CBG information.

Option 1: All or some of fields corresponding to the NDI and the MCS among the TB based DCI fields are used to represent a (re)transmission CBG. If a field size necessary to represent the CBG is not obtained, some states representing the CBG (for example, some states including some CBG combinations in the case of the RIV method) may not be used. More specifically, when there is a plurality of CWs, all or some of the fields indicating the NDI and/or the MCS for each CW may represent CBG information of each CW. In addition, only the CB G information of a specific CW may be represented.

Option 2: All or some of the fields corresponding to the NDI, the MCS and resource allocation among the TB based DCI fields are used to represent a (re)transmission CBG. In the case of resource allocation, reduction according to RBG information may be considered. More specifically, when there is a plurality of CWs, all or some of the fields indicating the NDI and/or the MCS of each CW may represent CBG information of each CW, and a portion obtained from a resource allocation portion is equally divided to represent the CBG information of each CW. In addition, only the CBG information of a specific CW may be represented.

Option 3: All or some of the fields corresponding to resource allocation among the TB based DCI fields are used to represent a (re)transmission CBG. In the case of resource allocation, reduction according to RBG information may be considered.

Option 4: CBG based retransmission may be performed with respect to only a specific TB and, in this case, information on a plurality of CWs may be included in the DCI in consideration of MIMO operation. In this case, information on a specific CW may include information on a TB and information on another specific CW may include information on a CBG.

In the case of resource allocation, in the next-generation wireless communication system, time domain information may be included in addition to the frequency domain information. For example, a start symbol index, an end symbol index and/or a duration may be included. For example, when extra bits are obtained from resource allocation, the above time domain resource allocation information may be used. In this case, the assumption for the time domain resource during CBG retransmission, (1) may be established using initial transmission or most recently updated information of the same TB, (2) may be established in proportion to the number of retransmission CBGs (according to initial transmission or the step set in the higher layer), (3) may be established to reduce the field size in a manner of increasing granularity in the time domain, or (4) may be established through the DCI corresponding to the fallback operation or set in the higher layer. More specifically, during resource allocation, the granularity of the time domain may be adjusted to the field value in the DCI.

Figure 7:
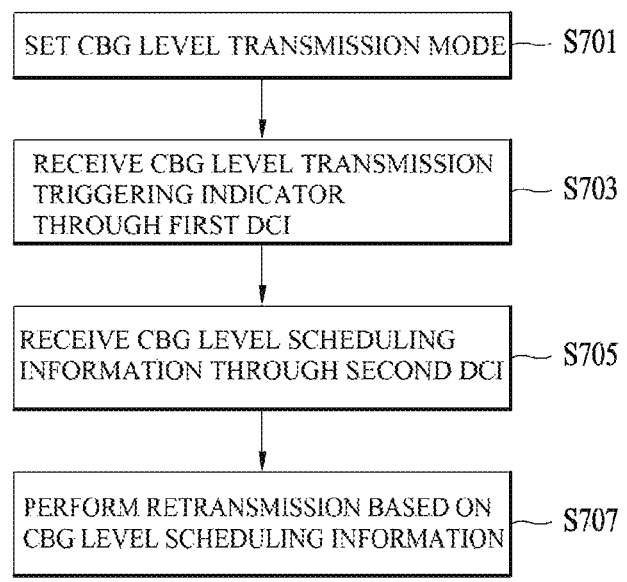
FIG. 7 is a flowchart illustrating a method of transmitting downlink control information according to an embodiment of the present invention.

FIG. 7 is a flowchart illustrating a method of transmitting downlink control information according to an embodiment of the present invention.

Referring to FIG. 7, in step 701, the UE sets a CBG level transmission mode through a higher layer and, more specifically, changes from a TB level retransmission mode to a CBG level retransmission mode. In particular, the higher layer is preferably an RRC layer. CBG level retransmission means that initial transmission is performed at the TB level and retransmission is performed in units of a CBG configuring the TB. In addition, the CBG may include one or more CBs.

Next, in step 703, the UE may receive a CBG level transmission triggering indicator through first DCI. Here, the first DCI includes resource allocation information for receiving second DCI. Preferably, non-toggling of a new data indicator (NDI) included in the first DCI means retransmission and thus the second DCI includes CBG level scheduling.

Next, the UE receives CBG level scheduling information through the second DCI in step 705 and performs retransmission based on the CBG level scheduling information in step 707. In particular, the first DCI has a fixed size and is preferably detected from a CCS. In contrast, in the second DCI, since the dimension of the scheduled resource is changed depending on whether CBG level scheduling or TB level scheduling is performed, the size of the second DCI may vary according to the CBG level transmission triggering indicator included in the first DCI. Further, the second DCI may include an indicator indicating buffer flushing of the CB level.

Figure 8:
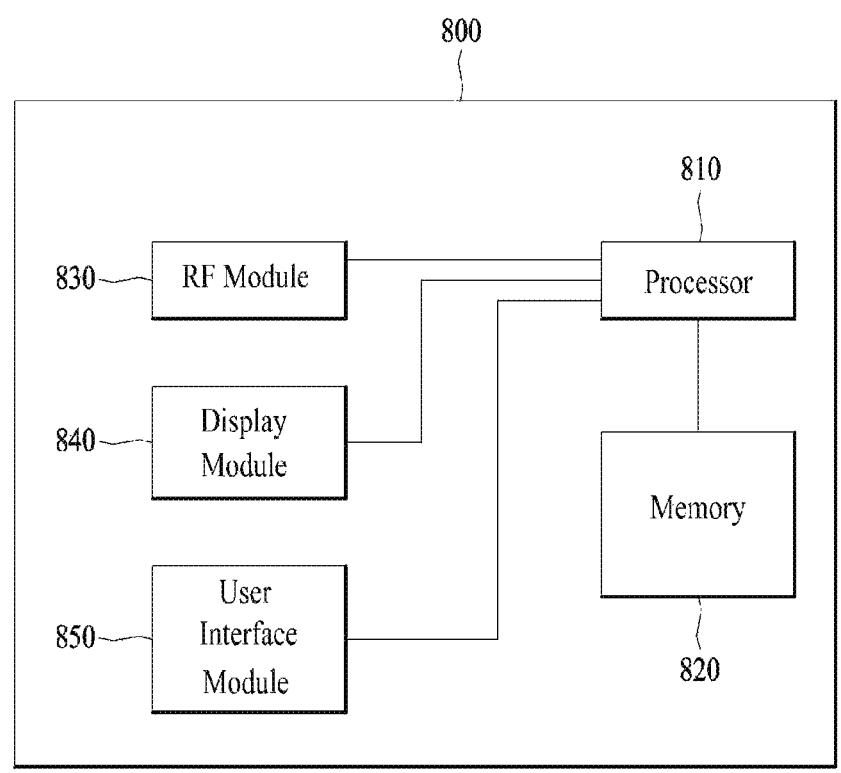
FIG. 8 is a block diagram of a communication apparatus according to an embodiment of the present invention.

FIG. 8 is a block diagram of a communication apparatus according to an embodiment of the present invention.

Referring to FIG. 8, a communication apparatus 800 includes a processor 810, a memory 820, a Radio Frequency (RF) module 830, a display module 840 and a user interface module 850.

The communication apparatus 800 is shown for convenience of description and some modules thereof may be omitted. In addition, the communication apparatus 800 may further include necessary modules. In addition, some modules of the communication apparatus 800 may be subdivided. The processor 810 is configured to perform an operation of the embodiment of the present invention described with respect to the drawings. For a detailed description of the operation of the processor 810, reference may be made to the description associated with FIGS. 1 to 7.

The memory 820 is connected to the processor 810 so as to store an operating system, an application, program code, data and the like. The RF module 830 is connected to the processor 810 so as to perform a function for converting a baseband signal into a radio signal or converting a radio signal into a baseband signal. The RF module 830 performs analog conversion, amplification, filtering and frequency up-conversion or inverse processes thereof. The display module 840 is connected to the processor 810 so as to display a variety of information. As the display module 840, although not limited thereto, a well-known device such as a Liquid Crystal Display (LCD), a Light Emitting Diode (LED), or an Organic Light Emitting Diode (OLED) may be used. The user interface module 850 is connected to the processor 810 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method and apparatus for transmitting downlink control information having a dynamic variable size in a wireless communication system to a 3GPP LTE system has been described, the present invention is applicable to various wireless communication systems in addition to the 3GPP LTE system.

The invention claimed is:

1. A method of receiving downlink signals from a base station by a user equipment (UE) in a wireless communication system, the method comprising;
receiving downlink control information for code block group based transmission of a transport block from the base station; and
receiving a downlink data based on the downlink control information,
wherein the transport block comprises a plurality of code block groups,
wherein the downlink control information includes bitmap information indicating whether each of the plurality of code block groups exists in the downlink data or not; and
wherein the downlink control information includes information other than a new data indicator (NDI), the information indicating whether a buffer of the each of the plurality of code block groups is to be flushed or not.

2. The method according to claim 1, further comprising: receiving information for configuring the code block group based transmission from the base station.

3. The method according to claim 1, further comprising: receiving information about a number of code block groups via an upper layer.

4. The method according to claim 1, wherein the downlink control information has a fixed size regardless of a number of code block groups which exist in the downlink data.

5. A user equipment (UE) in a wireless communication system, the UE comprising:
a wireless communication module; and a processor connected to the wireless communication module, wherein the processor is configured to:
receive downlink control information for code block group based transmission of a transport block from the base station; and
receive a downlink data based on the downlink control information;
wherein the transport block comprises a plurality of code block groups,
wherein the downlink control information includes bitmap information indicating whether each of the plurality of code block groups exists in the downlink data or not and
wherein the downlink control information includes information other than a new plurality of code block groups is to be flushed or not.

6. The UE according to claim 5, wherein the processor is further configured to receive information for configuring the code block group based transmission from the base station.

7. The UE according to claim 5, wherein the processor is further configured to receive information about a number of code block groups via an upper layer.

8. The UE according to claim 5, wherein the downlink control information has a fixed size regardless of a number of code block groups which exist in the downlink data.

* * * * *